Dec. 16, 1958　　P. F. RICHARDSON ET AL　　2,864,474
BRAKABLE TWO-SPEED TRANSMISSION
Filed Oct. 25, 1956　　3 Sheets-Sheet 2
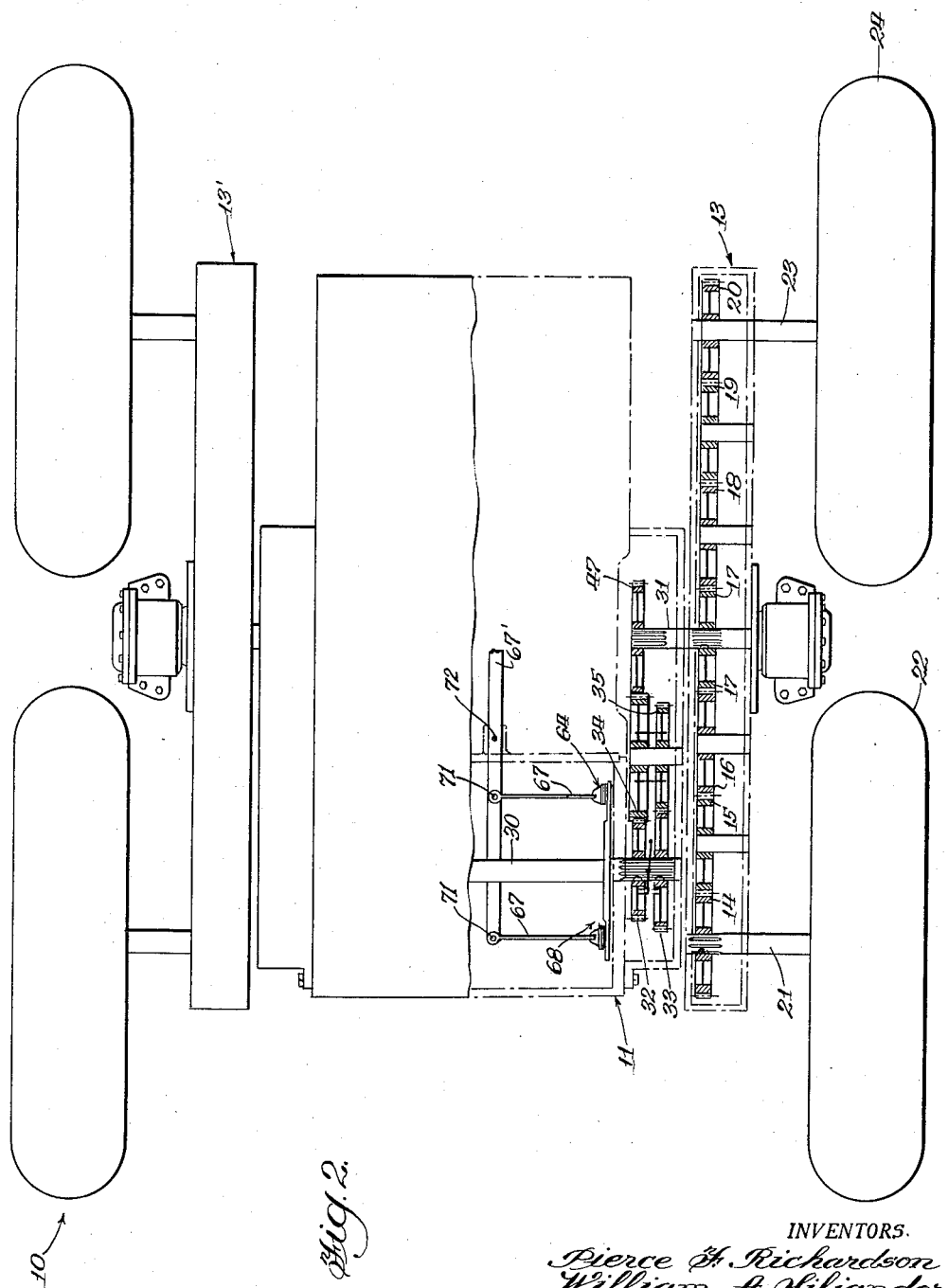
INVENTORS.
Pierce F. Richardson
William A. Siljander
Paul O. Pippel
Atty.

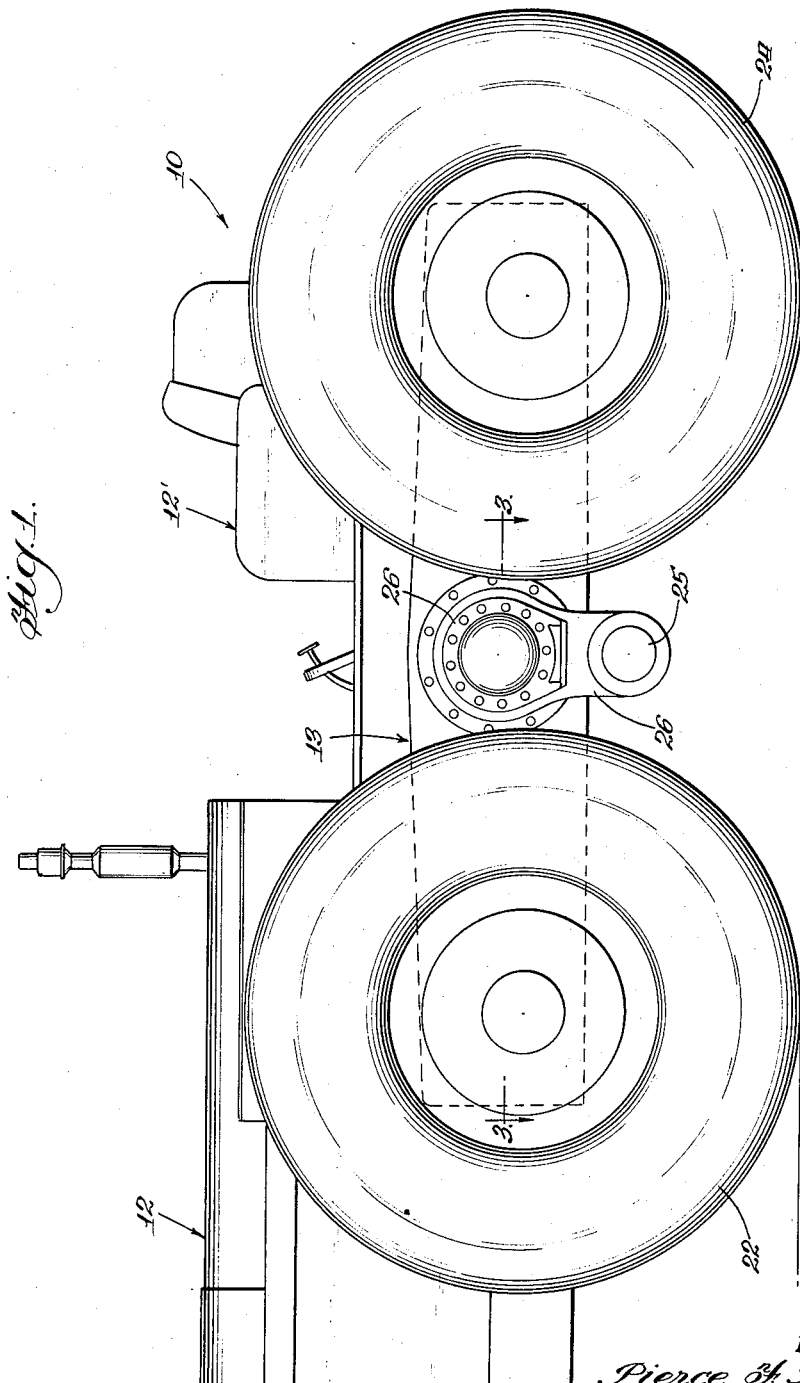

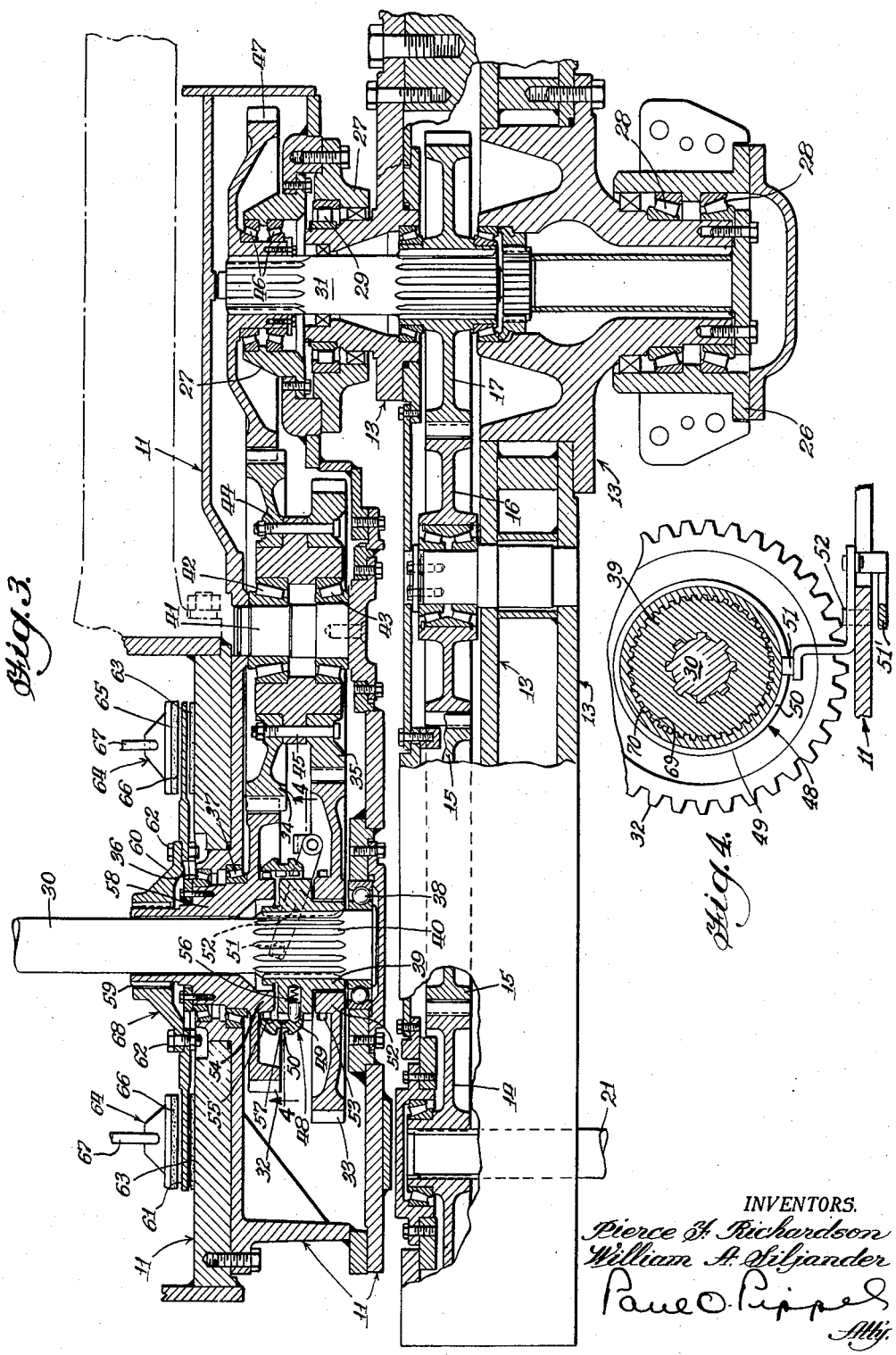

United States Patent Office 2,864,474
Patented Dec. 16, 1958

2,864,474

BRAKABLE TWO-SPEED TRANSMISSION

Pierce F. Richardson, Barrington, and William A. Siljander, Oak Park, Ill., assignors to International Harvester Company, a corporation of New Jersey Application October 25, 1956, Serial No. 618,287

2 Claims. (Cl. 192—4)

This invention relates to a two-speed brakable transmission. More in particular this invention relates to a brakable auxiliary transmission for power driven vehicles. Still more in particular this invention relates to a brakable two-speed transmission adapted for use in power driven steering-by-driving vehicles such as crawler and four-wheel drive tractors.

Generally speaking farm and industrial type tractors are geared so that they are capable of performing heavy load tasks. In order to conserve the capacity or size of the power plant required tractors are usually geared quite low in the conventional transmission in order to provide the necessary pulling power. Thus even under no-load conditions the maximum speed at which the tractor can be driven by the conventional transmission is of low order. Therefore during transport of the vehicle such as on highways the vehicle moves slowly and time consuming as well as the causing of highway traffic congestion.

It is the prime object of this invention to provide a two-speed auxiliary transmission for vehicles of the class described adapted to be interposed between the vehicle's conventional transmission and its final drive to the ground engaging elements so that the vehicle may be moved at relatively high speed or at a slow speed.

It is a further object of this invention to provide an auxiliary transmission in accordance with the preceding object whereby an independently operable brake is provided thereon adapted for braking the driven elements thereof irrespective of the driving relation between the vehicle's power plant and the ground engaging elements.

These and other desirable objects inherent in and encompassed by the invention will be more readily understood from the ensuing description, the appended claims and the annexed drawings wherein:

Figure 1 is a side elevation of a four-wheel drive industrial type tractor illustrating one type of vehicle to which this invention may be adapted;

Figure 2 is a top elevation, partly in section and broken away and also partly in schematic illustrating the invention interposed in the gear train between the conventional transmission and the final drive to the ground engaging elements of the vehicle shown in Figure 1;

Figure 3 is a view, partly in section and partly broken away, taken on line 3—3 of Figure 1 illustrating the detailed construction of a preferred embodiment of this invention, and Figure 4 is a sectional view taken along the line 4—4 of Figure 3 illustrating the control means in detail for shifting a clutch mechanism.

With continued reference to the drawings the numeral 10 generally indicates a four-wheel drive industrial tractor of the steering-by-driving type. The tractor 10 may be comprised of a frame generally indicated at 11 having a power plant shown generally at 12 and an operator's station including a seat indicated at 12'. On each side of the tractor 10 there is provided a bogie frame indicated at 13 and 13' respectively in Figure 2. Since both sides of the tractor 10 is constructed symmetrically with respect to each other only one side will be described in detail and it should be assumed that the construction of the opposite side is similar thereto. It should be understood that the frame 11 may comprise a plurality of members connected together to form a rigid structure.

The bogie frame 13 is provided with a train of gears 14, 15, 16, 17, 18, 19, 20 all journalled thereto for rotation in permanent meshed relation. The bogie gear 14 is drivingly keyed to a front final drive shaft 21 which shaft extends outwardly in driving relation with a front wheel or ground engaging element 22. Similarly the bogie gear 20 is drivingly keyed to a rear final drive shaft 23 which shaft also extends outwardly in driving relation with a rear wheel or ground engaging element 24. Thus it will be seen from Figure 2 that rotational movement of the wheel 22 causes corresponding movement in the same speed and direction as the wheel 24 because the bogie gear 14 is meshed with the bogie 15, the gear 15 being meshed with the gear 16, the gear 16 being meshed with the gear 17, the gear 17 being meshed with the gear 18, the gear 18 being meshd with the gear 19 and the gear 19 being meshed with the gear 20. The gears 14 through 20 are mounted for rotation on the bogie frame 13 by any of the conventional type bearings which is obvious to those skilled in the art and need not be further described here.

From the foregoing it can be seen that the bogie frame 13 is supportingly carried by the wheels 22 and 24 through the respective final drive shafts 21 and 23.

The tractor frame 11 is provided with a rigidly connected transverse rod or bar 25 which extends outwardly and slightly beyond the bogie frame 13. The outer end of the rod 25 is provided with an upwardly extending arm 26 rigidly connected thereto. Between the tractor frame 11 and the inner side of the bogie frame 13 there is also provided an upward extending arm 27 in rigidly connected relation to the rod 25 as best shown in Figure 3. The upper ends of the arms 26 and 27 are provided respectively with axially spaced bearings 28 and 29 which bearings are journalled to the bogie frame 13. Thus the frame 11 of the tractor 10 is supported rotatively by the bogie 13 through the bearings 28 and 29 on the arms 26 and 27, respectively and the rod 25.

Since the frame 11 of the tractor 10 is pivotally rotatable transversely about the bogie frame 13 through the pivotal connection of the bearings 28 and 29, a conventional type second supporting mechanism is provided which connects the forward portion of the bogie frame 13 with the frame 11. This second suspension is necessary to limit the rotational movement of the bogie frame 13 with respect to the tractor frame 11 as otherwise the frame 11 would tilt due to the weight of the power plant. As such a suspension forms no part of the present invention it is suffice to say that most any type of resilient suspension mechanism may be employed for the purpose described.

Now in order to propel the tractor 10 the power plant 12 is drivingly connected through a conventional clutch and transmission (not shown) to a drive shaft 30 journalled for rotation on the frame 11. By employing suitable clutching and braking mechanisms the rate of rotation of the drive shaft 30 may be varied with respect to the corresponding drive shaft (not shown) on the other side of the tractor so that steering-by-driving may be effected in a conventional manner. In the conventional tractor the drive shaft 30 is drivingly connected to a driven shaft 31, which driven shaft 31 in turn is drivingly connected to the gear 17, through a train of gears similar to that described for the bogie frame 13. However, this invention contemplates the driving connection between the drive shaft 30 and the driven shaft 31 by an auxiliary two-speed transmission which transmission is brakable independent of the drive shaft 30.

The two-speed brakable auxiliary transmission of this invention includes the provision of a first gear 32 (Figure 3), a second gear 33, a third gear 34 and a fourth gear 35. The first gear 32 is supported by the tractor frame 11 through spaced bearings 36 and 37 mounted in the frame 11 as shown in Figure 3. It will be noted that the gear 33 (high speed) is of a larger diameter than the gear 32 (low speed). Journalled for axial rotation in the first gear 32 is the drive shaft 30 which shaft is carried in part by the bearing 38 mounted in the frame 11. The other or inner end of the shaft 30 may be supported by other bearings (not shown). Adjacent the outer end of the drive shaft 30 is a clutch member 39 disposed concentrically and keyed for rotation with the shaft 30 such as by a splined portion 40 on the shaft 30 corresponding to an internal spline on the clutch member 39.

Mounted on an annular shoulder portion on the outer end portion of the clutch member 39 is the second gear 33 in journalled relation. Thus the shaft 30 is rotatable independently of either the first gear 32 or the second gear 33.

On the frame 11 is a stationary bearing mount 41 which supports a pair of axially spaced bearings 42 and 43 as shown in Figure 3. Supported by and journalled for rotation on the bearing 42 is mounted the third gear 34 which gear is of the necessary diameter to mesh with the first gear 32. Similarly supported by and journalled for rotation on the bearing 43 is mounted the fourth gear 35 which gear is of the necessary diameter to mesh with the second gear 33. It will be noted from Figure 3 that the third gear 34 is constrained for rotation with the fourth gear 34 by interlocking the two gears together such as with bolts 44 and 45.

The frame 11 is provided with a pair of axially spaced bearings 46 for rotatably supporting a driven gear 47. The gear 47 is keyed to the driven shaft 31 in driving relation which shaft is also keyed to the bogie gear 17 in driven relation as previously explained. The driven gear 47 is of such diameter as may be necessary to mesh with the third gear 34 as is shown in Figure 3.

From the foregoing it can be readily seen that the first gear 32 and the second gear 33 are both in constant driving connection, through the various other gears described, with the final drive shafts 21 and 23 and the respective associated wheels 22 and 24 at all times. The means for drivingly connecting either the first gear 32 or second gear 33 with the drive shaft 30 will now be described.

Between the gears 32 and 33 on the drive shaft 30 is mounted a clutch generally indicated at 48. The clutch 48 may be comprised of the clutch member 39, previously described, keyed to the drive shaft 30 for rotation therewith. The outer peripheral surface of the clutch member 39 is splined at 69 as best shown in Figures 3 and 4. Concentrically disposed about the outer splined surface 69 of the member 39 is an annular shaped clutch element or sleeve 49 having an internally splined surface 70 corresponding to the splined surface 69 on the outer peripheral surface of the member 39. Thus the clutch element 49 is movable axially and is constrained for axial rotation with the member 39 and drive shaft 30. The outer peripheral surface of the clutch element 49 is provided with an annular recessed groove 50 adapted to receive slidably a yoke 51 or first control lever which is pivotally mounted to an extension of the frame 11 at 52 as best shown in Figure 4. From this it can be seen that pivotal movement of the control lever 51 through an extension 51' about 52 causes axial movement of the clutch element 49 with respect to the clutch member 39.

The hub portion 52' of the second gear 33 is provided with annularly disposed teeth 53 on the inner side thereof as best illustrated in Figure 3. Similarly on the inner side of the hub portion 54 there is disposed annular teeth 55. It should be noted that the radial dimensions from the axis of the shaft 30 of the hub 52 and teeth 53 are the same as that for the hub 54 and teeth 55.

The clutch element 49 is provided with a flanged portion on each of the two sides thereof. The inner peripheral surfaces of the two flanges are provided with teeth forming ring gears. The outer ring gear of the clutch element 49 is adapted to engage with the teeth 53 of the second gear 33 when the clutch element 49 is moved axially in an outward direction thereby engaging the second gear 33 for rotation with the shaft 30 through the clutch member 39 and clutch element 49. Similarly the inner ring gear of the clutch element 49 is adapted to engage with the teeth 55 of the first gear 32 when the clutch element 49 is moved axially in an inward direction engages the first gear 32 for rotation with the drive shaft 30 through the clutch member 39 and clutch element 49. It should be noted that when the clutch element 49 is in a central or neutral position neither the teeth 53 of the second gear 33 or the teeth 55 of the first gear 32 are in engaging relation with the clutch element 49. Thus the drive shaft 30 may be engaged drivingly with one or the other of the gears 32 and 33 or in a disengaged neutral relation with respect to the gears 32 and 33.

Now in order to maintain engagement of the clutch 48 with either of the two gears 32 and 33 or in a neutral position the clutch 48 may be provided with a detent mechanism generally indicated at 56. This detent 56 may comprise a radial bore in the clutch member 39 having the usual compression spring and ball disposed therein. The inner periphery surface of the clutch element 49 is provided with three axially alined depressions one of which is shown at 57 adapted to engage the ball in a commonly known manner. Thus the detent mechanism 56 by engagement of the ball with one of the depressions 57 will prevent spontaneous axial movement of the clutch element 49.

Summarizing it can be now seen that means have been described for drivingly engaging the drive shaft 30 with the driven shaft 31 alternately in one of two speeds or a neutral condition wherein the drive shaft 30 is disengaged from driving relation with the driven shaft 31.

In tractors of the kind described it has been customary to brake the vehicle by braking the drive shaft 30 because of the "floating" relation of the bogie frame on each side with respect to the tractor frame. However where the two-speed auxiliary transmission as described above is employed it is obvious to anyone skilled in the art that a brake applied to the drive shaft 30 is wholly inadequate. It is quite apparent that the conventional braking of the drive shaft 30 would not brake the movement of the tractor when the two-speed auxiliary transmission is in a neutral position. Thus a potentially dangerous condition exists if conventional braking mechanisms are employed. In order to circumvent this possible condition means are provided for directly braking the first gear 32 which gear of course is drivingly connected at all times with the final drive shafts 21 and 23 and the respective wheels 22 and 24 through the gear trains previously described. A brake element indicated at 68 or means for braking the vehicle independently of the drive shaft 30 will now be described.

It will be seen from Figure 3 that the first gear 32 is provided with a large hub 58 extending through the frame 11 and journalled for rotation concentrically about a portion of the drive shaft 30. The extreme inner end portion of the hub 58 is splined at 59 on the outer peripheral surface thereof. A brake hub 60 having a splined internal bore is disposed over the splined portion 59 of the hub 58 so that the brake hub 60 is movable axially but is constrained for rotation with the first gear 32. The brake hub 60 is provided with an annular disc or brake disc 61 rigidly connected together by a plurality of radially disposed bolts, two of which are shown at 62. From this it is readily apparent that the brake disc 61 rotates with the first gear 32.

An annular shaped stationary ring 63 of resilient construction is mounted on the frame 11 which ring engages with the brake disc 61 when the disc 61 is moved outwardly or axially with the hub 60 on the splined connection at 59. Adjacent the inner side of the disc 61 is mounted a conventional movable brake yoke or shoe generally indicated at 64 which shoe may also be in the form of an annular ring 65. The brake shoe 64 is also provided with an annular shaped ring 66 of resilient construction mounted rigidly thereon. A second control lever 67' is pivotally connected at 72 to the shoe 64 through rods 67 pivotally connected at 71 so that actuation of the control lever 67' in one direction causes the ring 66 to engage the disc 61. The outward movement of the shoe 64 in engagement with the disc 61 causes the outward movement of the disc 61 through the splined connection 59 whereby the disc 61 engages the ring 63. The engagement of the rings 63 and 66 with the disc 61 brakes the disc 61 which in turn brakes the first gear 32. The gear 32 being meshed with the third gear 34 which in turn is meshed with the driven gear 47 brakes the driven shaft 31. The driven shaft 31 being in driving relation with the wheels 22 and 24 through the respective final drive shafts 21 and 23 causes braking of the entire vehicle. It will be noted that the brake element or mechanism associated with the auxiliary two-speed transmission is operable to brake the tractor irrespective of whether the clutch 48 is engaged with either of the gears 32 and 33 or in a neutral position.

Having thus described an embodiment of the invention it can now be seen that the objects of the invention have been fully achieved and it must be understood that changes and modifications may be made which do not depart from the spirit of the invention nor from the scope thereof as defined in the appended claims.

What is claimed is:

1. For a power driven vehicle a brakable two-speed auxiliary transmission comprising a frame, a first gear mounted on and journalled for rotation on said frame, a second gear mounted on and journalled for rotation on said frame, one of said gears being of greater diameter than the other of said gears, said second gear being positioned in coaxially spaced relation with respect to said first gear, a drive shaft journalled for coaxial rotation in said first and second gears, a rotatable clutch member mounted on said drive shaft between said first and second gears, said clutch member being constrained for rotation with said drive shaft, a clutch element disposed concentrically about said clutch member, said clutch element being axially slidable and constrained for rotation with said clutch member, said clutch element being positioned to engage releasably at least one of said first and second gears in driving relation, a brake element mounted on and constrained for rotation with said first gear, a third gear mounted on and journalled for rotation on said frame and being in driving relation with a driven shaft, said third gear being in meshed relation with said first gear, a fourth gear mounted on and journalled for rotation on said frame, said fourth gear being positioned in coaxial spaced relation with respect to said third gear, said fourth gear being constrained for rotation with said third gear and in meshed relation with said second gear, a first control lever mounted on said frame and positioned to move said clutch element from a neutral position into engagement with one of said first and second gears thereby drivingly connecting said clutch member and said drive shaft with one of said third and fourth gears, a driven shaft mounted on said frame in driving relation with said third gear, a brake shoe mounted on said frame positioned to engage releasably said brake element, and a second control lever mounted on said frame and adapted to move said brake shoe into engagement with said brake element for braking the rotative movement of said first and third gears.

2. For a power driven vehicle a brakable two-speed auxiliary transmission comprising a frame, a drive shaft and a driven shaft rotatably supported by said frame, a first gear and a second gear mounted rotatably on said frame, one of said gears being of greater diameter than the other of said gears, a clutch member mounted on and constrained for rotation with said drive shaft, a clutch element mounted concentrically about said clutch member, said clutch member and said clutch element being positioned intermediate said gears, said clutch element being axially slidable and constrained for rotation with said clutch member, said clutch element being adapted for axial movement from a neutral position into releasable selective engagement with one of said gears, a first control lever mounted on said frame and adapted to move said clutch element in an axial direction, a third gear rotatably mounted on said frame and in meshed relation with said first gear, a fourth gear rotatably mounted on said frame and in meshed relation with said second gear, said third gear being rotatably constrained with said fourth gear, one of said third and fourth gears being in driving relation with said driven shaft, a brake element rotatably mounted on said frame, said brake element being connected in driven relation with one of said gears, a brake shoe mounted on said frame positioned to engage releasably said brake element, and a second control lever mounted on said frame adapted to move said brake shoe into releasable engagement with said brake element for braking the rotative movement of said gears.

References Cited in the file of this patent
UNITED STATES PATENTS

| | | |
|---|---|---|
| 2,450,896 | Kimberly | Oct. 12, 1948 |
| 2,573,593 | Norden et al. | Oct. 30, 1951 |